Jan. 7, 1969　　　L. SCHAFER　　　3,420,194
FOURFOLD PASTRY MAKING DEVICE
Filed Sept. 19, 1967
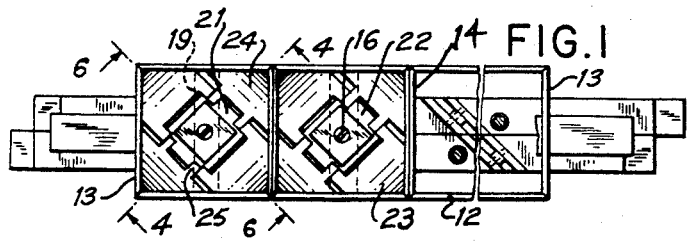
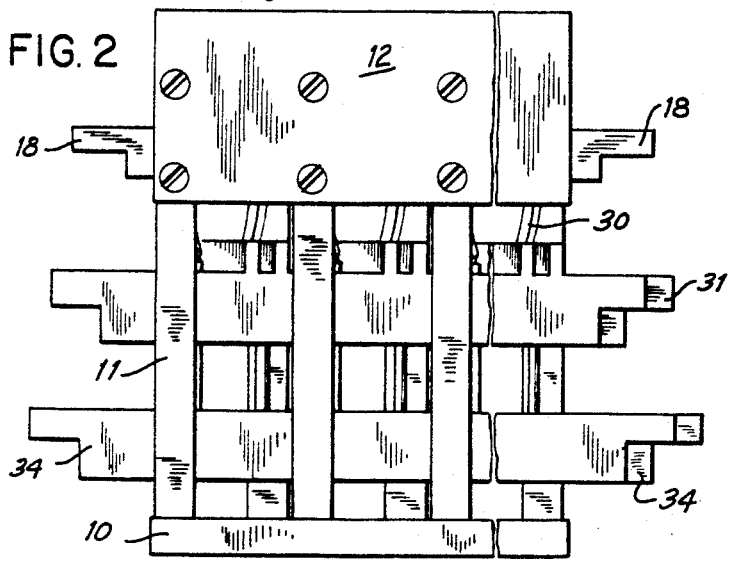
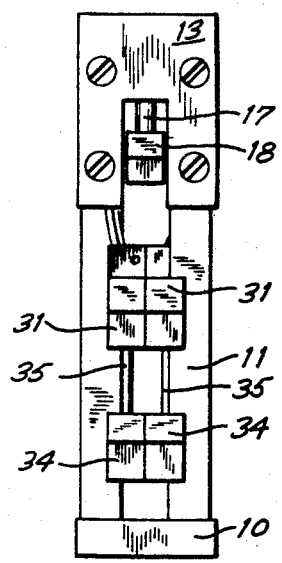
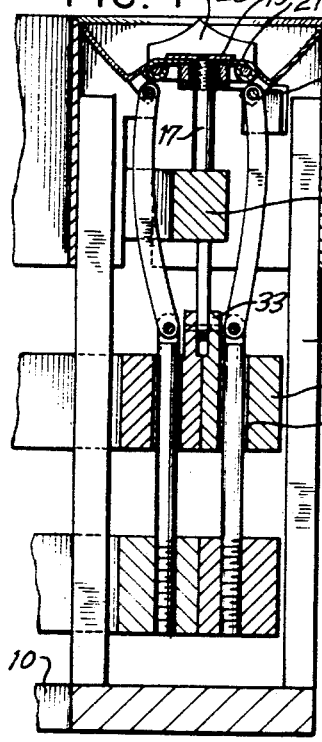
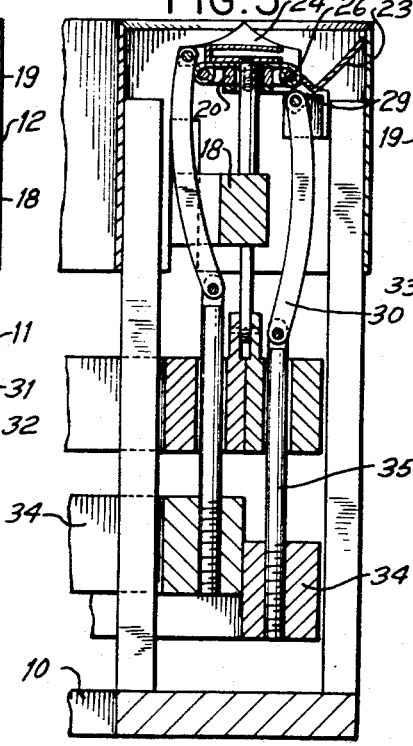
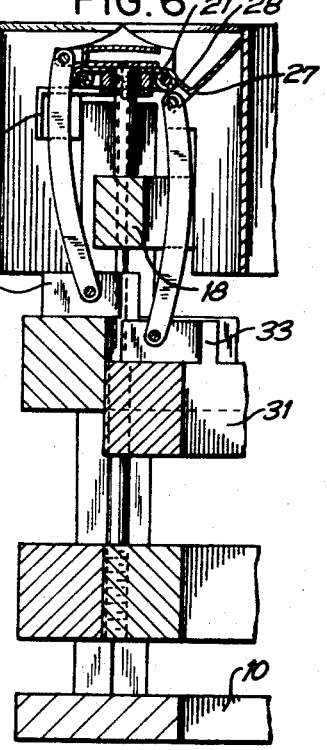

United States Patent Office 3,420,194
Patented Jan. 7, 1969

3,420,194
FOURFOLD PASTRY MAKING DEVICE
Leonhard Schafer, 2770 Briggs Ave.,
Bronx, N.Y. 10458
Filed Sept. 19, 1967, Ser. No. 668,831
U.S. Cl. 107—9        3 Claims
Int. Cl. A21c 11/00

ABSTRACT OF THE DISCLOSURE

This invention relates to a mechanical device for successively folding over the four corners of a square of pastry dough over a filling placed centrally upon said square. The device utilizes individually operated folding fingers, each finger being hingedly secured to a central stationary plate.

---

This invention is illustrated in the accompanying drawing in which

FIG. 1 is a top view of the device, broken away in part, and showing a plurality of linearly disposed pastry folding cells and showing in dotted outline a stationary bracket secured to opposing side walls.

FIG. 2 is a side view of the device of FIG. 1 showing the hand operated lifter beams used to effect a folding action of each of the four corners as well as a top lifter beam used for lifting the fourfolded pastry above the opening of the cells.

FIG. 3 is an end view of the device showing the four folding notched hand operated beams used for effecting successive end folding of the dough pastry square and showing the end of the notched lifter beam adjacent the top of the device.

FIG. 4 is a section view taken on line 4–4 of FIG. 1, showing the stationary bracket secured as by welding to a side wall, a spacer bar secured to said bracket by welding and a centrally apertured stationary hinge plate to which the four folding fingers are hingedly secured, and showing further the manner of securing said fingers to the hand operated folding beams.

FIG. 5 is a view similar to FIG. 4 but showing the manner of folding over a suitably bent finger by a lifting of its corresponding folding beam and its connecting lever arm.

FIG. 6 is a section view similar to FIG. 5 taken on line 6–6 of FIG. 1 showing the manner of actuation of a lifter beam of the upper row on a lever and its folding finger.

Turning to the drawing, a metal base plate 10 is provided with a plurality of upright suitably spaced apart supports or pillars 11 welded thereto. An apertured side plate 12 is bolted to each side of the device adjacent the tops of the pillars. Opposing apertured end plates 13 are bolted to the end pillars.

Spacers plates 14 are welded to the opposing side plates to form a plurality of squares, or cells. The top edges of plates 12, 13, and 14 are cut at an angle to form a knife edge (FIG. 4) so that a blanket of dough placed upon the knife edges will be cut into squares and fall by gravity into the cells when the action of a rolling pin is applied to the blanket.

The cut squares fall upon a flat square lifter plate 15 secured by bolt 16 to a post 17, which post 17 is secured in turn firmly to the top lifter notched beam 18. This beam 18 extends from end to end of the device (FIG. 2) and lifts all of the four-folded pastry units at one time out of their respective cells.

As shown in FIGS. 4, 5 and 6, the cells are each provided with a broad base U-shaped bracket 19 the bent ends of which are welded to the opposing side walls. The brackets 19 are each centrally apertured to permit passage of post 17. A pair of spacer bars 20 are welded to the bracket 19 about the aperture thereof and a hinge plate 21 is welded to the bars and thus to each bracket. Thus the hinge plate 21 is stationary and is of substantially square configuration and is provided with bent over hinge receiving portion 22 on each of its four sides.

A suitably bent folding finger 23 having a triangular portion 24 and a bent over hinge pin receiving portion 25 is secured by pin 26 to each of the four portions 22 of hinge plate 21. The fingers 23 are each provided with bent right angular troughs 27 so that the pastry dough may be folded over and above the filling set upon the dough (FIGS. 5 and 6).

As shown in FIG. 1, the triangular portions 24 of the four fingers 23 nest in their respective corners of the cell. Each of the small bottom sections 28 of the bent fingers 23 is provided on its rear surface with a lug 29 welded thereto. Each lug 29 is hingedly secured to a dual apertured lever arm 30 at the top end thereof. The lever arms are hingedly secured at their bottom apertured ends to respective notched hand operated beams.

The top pair of beams 31 are provided with a plurality of suitably located apertures 32. The beams 31 are also provided with upright lugs 33 suitably disposed beneath respective cells. The base or bottom end of a respective lever arm 30 is hingedly secured to each lug 33.

A bottom pair of notched beams 34 are provided for respective operation of folding fingers. The beams 34 are provided with threaded apertures in which a rod 35 is disposed. The rods 35 pass through the respective apertures of a beam 31 thereabove, and are hingedly secured to a lever arm 30.

The illustrative embodiment herein is shown as a hand operated device but in actual operation all the beams are actuated in a timed and patterned sequence from a mechanically operated cam assembly actuated in turn by electrical power. After the four folded operation is completed the lifter beam is actuated and the folded pastry is lifted above the openings of the cells to be removed therefrom.

What is claimed is:

1. A pastry making device for successively folding the four corners of a pastry sheet over an edible filling centrally disposed thereon comprising a base, a plurality of parallel rows of upright supports secured to said base, sheet means having an exposed cutting edge secured between and about said supports at the top thereof forming a plurality of square pastry receiving cells; centrally apertured bracket means fixedly secured to a pair of opposed sheet means in each of said cells; a substantially square hinge plate having pin receiving portions on each edge fixedly secured to said bracket means; a movable finger having a pin receiving portion secured by a pin to each of said pin receiving portions of said hinge plate, said finger also having a base portion disposed at an angle to a triangular portion; an apertured stud fixedly secured to each base portion of said fingers; a longitudinal lever arm apertured at each end hingedly secured at its top to each of said studs and a plurality of four beams disposed between said supports, each beam hingedly secured to the bottom of a respective lever arm, whereby successive operation of said four beams effects successive folding over of the corners of a pastry sheet disposed on said hinge plate.

2. The device of claim 1 wherein said hinge plate is centrally apertured and comprising a lift plate disposed upon said hinge plate; a rod secured to the underside of said lift plate and extending through said aperture of said hinge plate and a lift beam disposed between said supports and secured to said rod whereby the four folded pastry units are lifted above the opening of said cell to facilitate removable.

3. The device of claim 1 wherein said four beams secured to said lever arms are disposed one pair above the other, said top pair being suitably apertured, and comprising an extension post fixedly secured to each beam of the bottom pair of beams and passing an aperture of a respective beam of said top pair of beams and secured hingedly to a bottom end of a respective lever arm.

References Cited
UNITED STATES PATENTS

| | | | |
|---|---|---|---|
| 628,449 | 7/1899 | Carr | 107—54.2 |
| 2,055,726 | 9/1936 | Moss | 107—8 XR |
| 2,574,548 | 11/1951 | Deutsch | 107—9 |
| 2,747,521 | 5/1956 | Gardner | 107—1.6 |
| 2,969,025 | 1/1961 | Schafer | 107—8 |
| 3,190,240 | 6/1965 | Archer et al. | 107—1 |
| 3,257,973 | 6/1966 | Schafer | 107—9 |
| 3,265,016 | 8/1966 | Yau Tak Cheung | 107—1.1 |
| 3,379,139 | 4/1968 | Lipinsky | 107—1.7 |

WALTER A. SCHEEL, *Primary Examiner.*

ARTHUR O. HENDERSON, *Assistant Examiner.*